United States Patent [19]

Komatsu et al.

[11] Patent Number: 4,648,001
[45] Date of Patent: Mar. 3, 1987

[54] RECORDING AND REPRODUCING DISK CASSETTE WITH IMPROVED, SLIDABLE SHUTTER PLATE

[75] Inventors: Fumito Komatsu; Akiyoshi Toyama; Yuzo Oguchi; Kiyoharu Iwanami, all of Nagano, Japan

[73] Assignee: Kabushiki Kaisha Sankyo Seiki Seisakusho, Nagano, Japan

[21] Appl. No.: 726,602

[22] Filed: Apr. 23, 1985

[30] Foreign Application Priority Data

Apr. 27, 1984 [JP] Japan .................................. 59-83983

[51] Int. Cl.⁴ .......................... G11B 5/016; G11B 5/82
[52] U.S. Cl. ................................................... 360/133
[58] Field of Search ......................................... 360/133

[56] References Cited

U.S. PATENT DOCUMENTS 4,185,314  1/1980  Hatchett et al. .................... 360/133
4,525,758  6/1985  Nakagawa et al. ................ 360/133
4,546,397 10/1985  Asami et al. ....................... 360/133

Primary Examiner—Robert S. Tupper
Attorney, Agent, or Firm—Staas & Halsey

[57] ABSTRACT

A recording and reproducing disk cassette having a case accommodating a rotatably mounted disk which is partially exposed through first openings provided in the case which are normally maintained closed by a shutter plate which is moved when the cassette is loaded by the disk to expose the first openings, including first steps provided on the case at an elevation below the outer surface of the case, second steps provided on the case at an elevation below the first steps, the shutter plate being slidably mounted on the second steps, and a protective plate having second openings coinciding with the first openings of the case and being fixedly mounted on the first steps of the case such that the protective plate covers the shutter plate.

8 Claims, 8 Drawing Figures

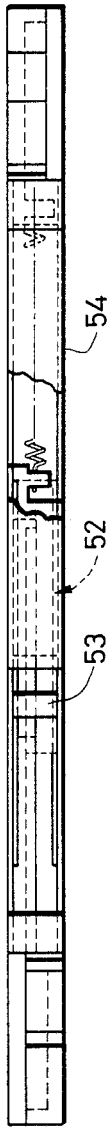
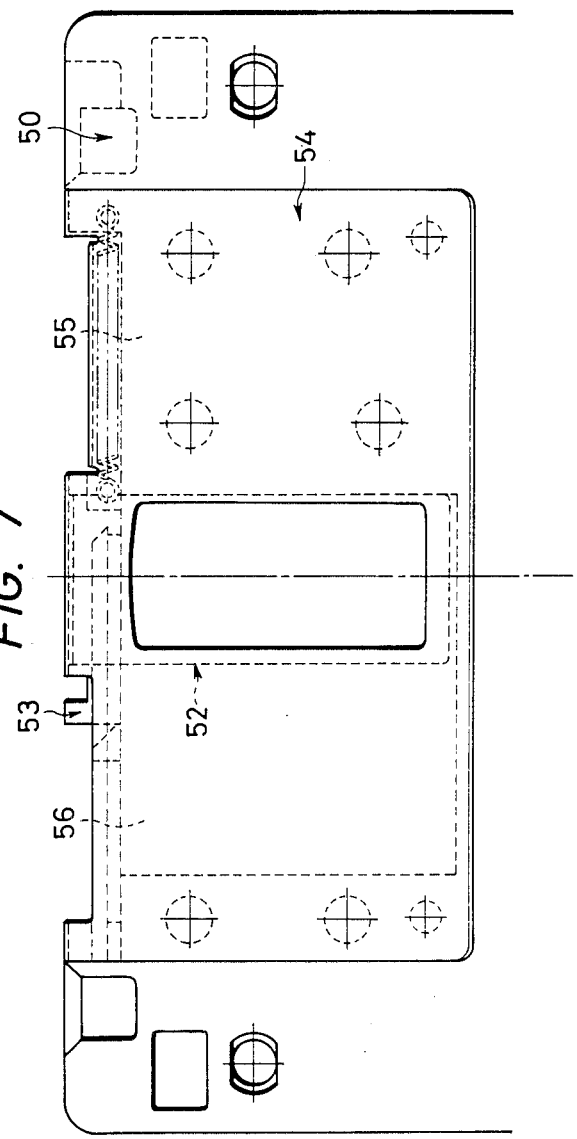

RECORDING AND REPRODUCING DISK CASSETTE WITH IMPROVED, SLIDABLE SHUTTER PLATE

BACKGROUND OF THE INVENTION

1. Field of the Invention

The present invention relates to a recording and reproducing disk cassette inside of which a recording and reproducing disk, such as a floppy disk, is rotatably supported, and in which the disk is partially exposed through an opening which is normally closed with a shutter plate.

2. Description of the Prior Art

One example of the variety of recording and reproducing disk cassettes known in the art is shown in FIG. 2, wherein a disk 2 is provided in the cassette 1 in such a manner that it may rotate together with a disk hub. A spindle hub extends through an opening in the lower half of the cassette 1 to engage the disk 2 to rotate same. The cassette is provided with an opening 3 exposing the disk 2 such that the disk 2 is brought into contact with a magnetic head. The opening 3 is normally closed by a shutter plate 4 urged by a spring (not shown). During recording and reproducing operation, the shutter plate 4 moves against the force of the spring exposing the disk 2 through the opening 3.

Although movement of the shutter plate 4 is essential, it is undesirable to apply too much force to an outer surface of the cassette 1 since this will reduce the ability of the shutter plate 4 to slide freely. On the other hand, a substantial reduction in the force with which the shutter plate 4 is urged to the outer surface of the cassette 1—while permitting the shutter plate 4 to move easily—may result in the shutter plate 4 (which is provided outside the cassette case 1) floating or moving from the cassette case 1 thus causing the shutter plate 4 to be manually bent, or result in the shutter plate 4 being engaged by other parts of the recording and reproducing device. As a result, the shutter plate 4 will be bent or will not be smoothly moved.

SUMMARY OF THE INVENTION

Accordingly, an object of the present invention is to provide a recording and reproducing disk cassette in which the "slideability" of the shutter plate is improved, while preventing the shutter plate from floating from the cassette case or being engaged by components of the recording and reproducing device.

The foregoing and other objects of the present invention are achieved by providing a cassette in which the disk is rotatably accommodated in the case and partially exposed through first openings formed in the case. These first openings are normally closed by a shutter plate. When the cassette is loaded, the shutter plate is moved to expose the first openings to allow the recording and reproducing head to contact the disk. The cassette case is provided with first steps, the height of which is less than the height of the outer surface of the case. Second steps are also provided, the height of which is less than the height of the first steps. The shutter plate is mounted on the second steps and urged by a spring to normally close the first openings. A protective plate, having second openings coincident in position to the first openings, is fixedly mounted on the first steps to cover the shutter plate.

These, together with other objects and advantages, which will be subsequently apparent, reside in the construction and operation of the present invention as more fully hereinafter described and claimed, reference being had to the accompanying drawings forming a part hereof, wherein like numerals refer to like parts throughout.

BRIEF DESCRIPTION OF THE DRAWINGS

FIG. 7 is a plan view of the cassette shown in FIG. 6; and

FIG. 8 is an end view of the cassette shown in FIG. 6.

DESCRIPTION OF THE PREFERRED EMBODIMENT

Figure 1:
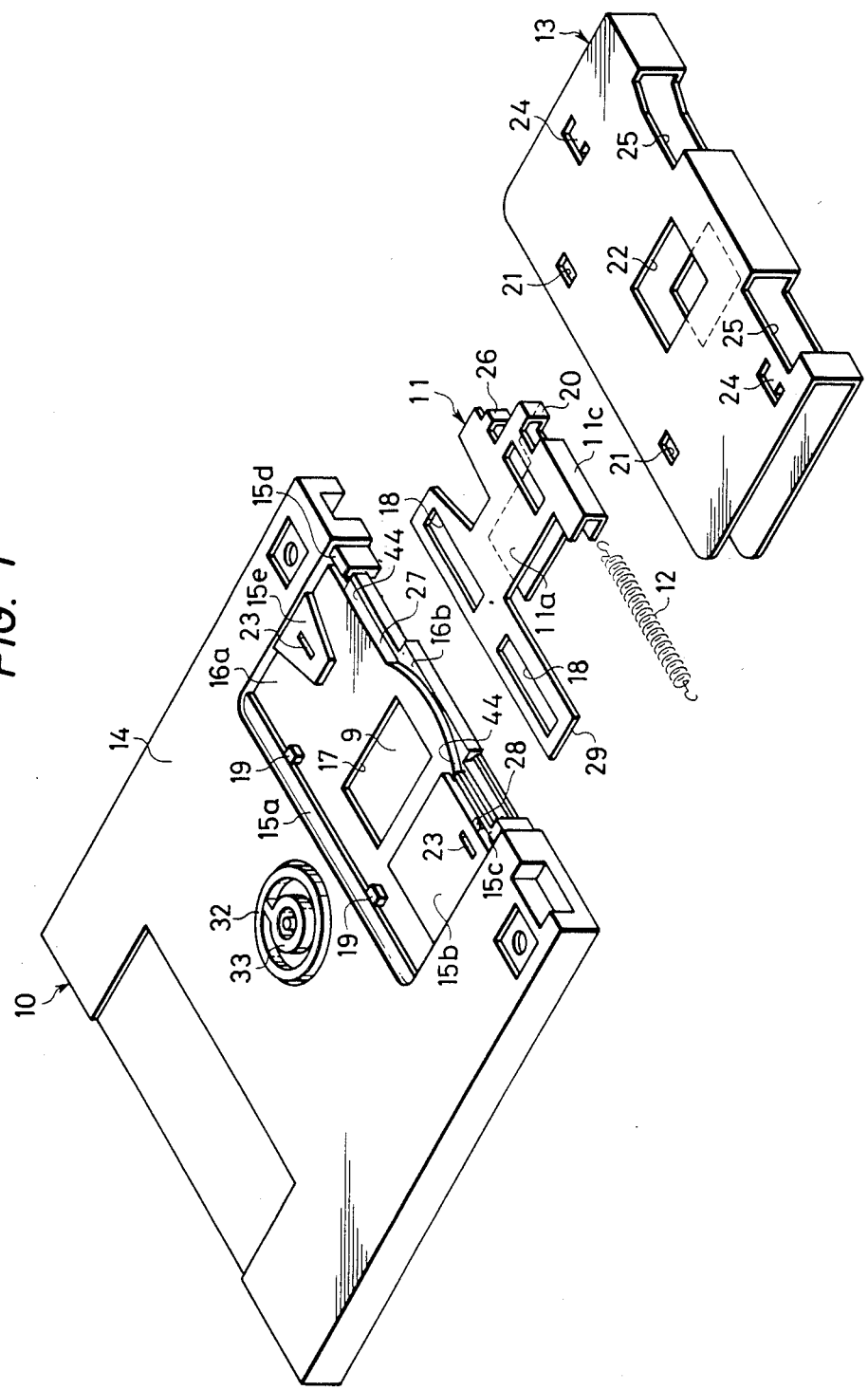
FIG. 1 is an exploded perspective view of a first embodiment of a recording and reproducing disk cassette according to the present invention.
Figure 2:
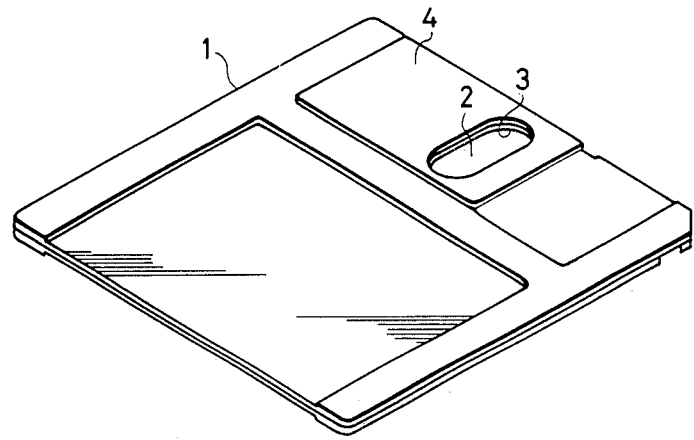
FIG. 2 is a perspective view of a conventional recording and reproducing disk cassette.

A first example of a recording and reproducing disk cassette (hereinafter referred to as "disk cassette" or "cassette") according to the present invention, as shown in FIG. 1, consists of a case 10 accomodating a floppy disk 9, a shutter plate 11, a spring 12 adapted to urge the shutter plate 11 in one direction and a protective plate 13 which is mounted in such a manner as to cover the shutter plate 11.

The case 10 has first steps 15a, 15b, 15c, 15d and 15e positioned below the outer surface 14 of the case 10 a distance which is as much as the thickness of the protective plate 13, and second steps 16a and 16b positioned below the first steps 15a–15e a distance which is as much as the wall thickness of the protective plate 13. The first steps may be formed by a single step if the shape of the first steps become large in size or the shutter plate 11 become small in size. An opening 17 is formed in the mid portion of the second step 16a. The opening 17 provides communication with the interior of the case 10 and exposes the disk 9 which is located within the case 10. With respect to the first and second steps, only one side of the case 10 has been described; however, similar first and second steps and an opening are suitably provided on the other side of the case 10 corresponding to the configurations of the shutter plate 11 and the protective plate 13.

The size, configuration and location of the shutter plate 11 is such that it slides over the second steps 16a and 16b. Elongated openings 18 are provided for guiding the movement of the shutter plate 11. More particularly, when the shutter plate 11 is mounted on the case 10, the guide openings 18 accommodate the protrusions 19 which extend upwardly from the second step 16a to a height which is substantially equal to that of the outer surface 14. The shutter plate 11 is provided with upper and lower mid portions 11a which are large enough to cover the opening 17 of the case 10. Furthermore, the shutter plate 11 is provided with a bent piece 26 to which one end of the spring 12 is connected. Finally, the shutter plate 11 is provided with a cut out portion 20 which is located in the connecting portion 11c located between the upper and lower mid portions 11a and which is engaged by a pin for moving the shutter plate 11, as described hereinafter.

The protective plate 13 is substantially U-shape in section, and is provided with holes 21 into which the protrusions 19 which extend upwardly from the second steps 16a are inserted. An opening 22 is provided in the protective plate 13 which is generally of the same size and located at the same position as opening 17 of the case 10. The protective plate 13 is also provided with downwardly bent pieces 24 which engage holes 23 formed in first steps 15b and 15e. Cut out portions 25 are provided in the protective plate 13 on each side of opening 22 such that the pin (not shown), mounted on the device, for moving the shutter plate 11 can move while engaging with the cut out portion 20 of the shutter plate 11. As seen in FIG. 1, the cut out portion 20 of the shutter plate 11 is exposed through the right cut out portion 25 of the protective plate 13. The disk recording and reproducing device has two turning levers provided with pins. One of the pins engages the cut out portion 20 of the shutter plate 11 and moves over a right step 44 to move the shutter plate 11 to the right side as seen in FIG. 1. The other pin slidingly moves on the step 44. When the cassette is turned over, the cut out portion 20 confronts the latter pin to move the shutter plate 11 leftward.

The case 10, shutter plate 11, spring 12 and protective plate 13 are assembled in the following manner. One end of the spring 12 is connected to the bent piece 26 of the shutter plate 11. The guide openings 18 of the shutter plate 11 are positioned over the protrusions 19 extending upwardly from the second step 16a. The bent piece 26 and the spring 12 are positioned within an elongated groove 27 which is formed between the second steps 16a and 16b. The other end of the spring 12 is connected to a pin 28 formed in the groove 27 such that the shutter plate 11 is urged towards the left, as seen in FIG. 1. In this position, the middle portions 11a of the shutter plate 11 cover the opening 17 in the case 10; that is, the disk 9 is not exposed.

The lower middle portion 11a, which is connected through the connecting portion 11c to the upper middle portion 11a, is similarly mounted on the second steps 16a and 16b provided on the lower side of the case 10. A detailed description of this part of the mounting and assembly operation is not necessary since it is substantially the same as previously described.

After the shutter plate 11 and the spring 12 have been coupled to the case 10, the protective plate 13 is mounted on the first steps 15a, 15b, 15c, 15d and 15e of the case 10. The protrusions 19 extending upwardly from the second step 16a of the case 10 are positioned within the holes 21 of the protective plate 13, and the downwardly bent pieces 24 are positioned within the holes 23 formed in the first steps 15b and 15e. As a result, the opening 22 of the protective plate 13 is positioned to coincide with the opening 17 of the case 10.

In this position, the mid portions 11a of the shutter plate 11 cover the opening 17 in the case 10 and the disk 9 in the case 10 is not exposed. The cut out portion 20 of the shutter plate 11 protrudes through one of the cut out portions 25 of the protective plate 13.

Figure 3:
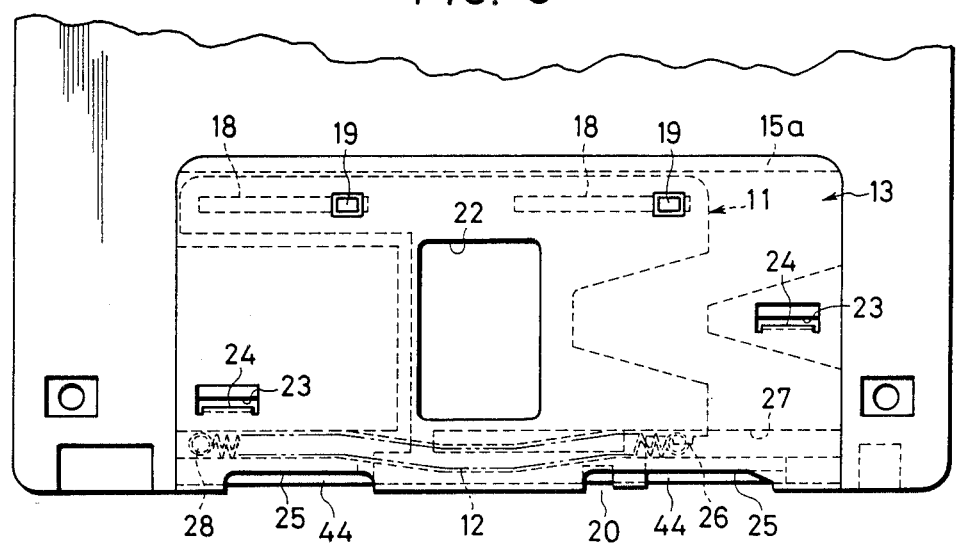
FIG. 3 is a plan view of a portion of the cassette shown in FIG. 1.

FIG. 3 illustrates the case 10, shutter plate 11, spring 12 and protective plate 13 in assembled position. When the cassette is loaded in the disk recording and reproducing device, one of the shutter plate moving pins engages the cut out portion 20 of the shutter plate 11.

As the cassette is loaded in the device, the pin is moved to the right side and the shutter plate 11 is moved in the same direction against the elastic force of the spring 12. That is, the middle portion 11a of the shutter plate 11 is moved to the right side such that the disk 9 is exposed through the opening 17 of the case 10 and the opening 22 of the protective plate 13. The cassette is thus set at the recording and reproducing position and the magnetic head can abut the disk.

When the cassette is unloaded from the disk recording and reproducing device, the above-described operation is carried out in reverse order, such that the opening 17 of the case 10 is closed by the mid portion 11a of the shutter plate 11.

Figure 4:
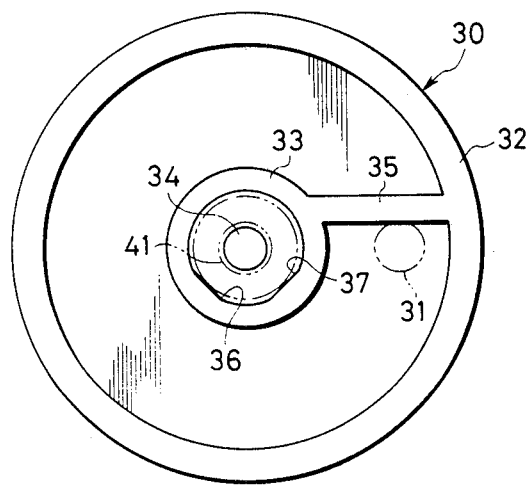
FIG. 4 is a plan view of the disk hub.

From FIG. 4 it will be apparent that the disk hub 30, on which the disk 9 is fixedly mounted, is rotated by a drive pin 31 formed on a spindle hub which is rotated by a motor (not shown). The disk hub 30 has a large, annular part 32 along the outer periphery, a smaller annular part 33 along the inner periphery, and a protrusion 34 at the center extending on both sides of the disk hub 30. The protrusion 34 is provided with a conical top, and the large annular part 32 is connected through a bank 35 to the smaller annular part 33. The inner wall of the small annular part 33 has flat surfaces 36 and 37, such that when the drive pin 31 formed on the spindle hub pushes the bank 35 to turn the disk hub 30, the disk hub 30 is positioned on the spindle hub by the flat surfaces 36 and 37.

Figure 5:
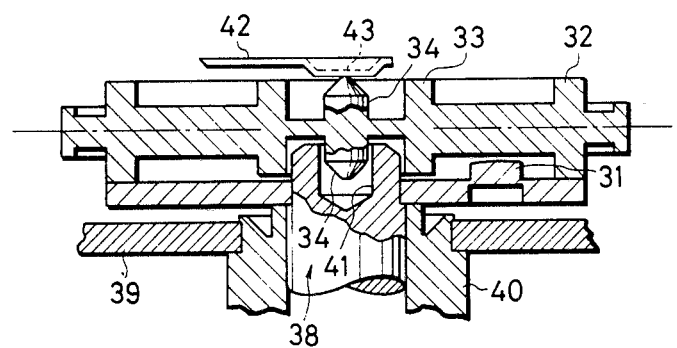
FIG. 5 is a sectional view showing the disk hub held on a spindle hub.

As seen in FIG. 5, the spindle hub 38 rotated by the motor (not shown) is rotatably supported by a bearing 40 provided on a chassis 39. An opening 41 is formed in the top surface of the spindle hub 38, and the protrusion 34 of the disk hub 30 fits within the opening 41. The drive pin 31 is formed in the hub portion of the spindle hub 38 by pressing.

The disk hub 30 is positioned in a vertical direction, as seen in FIG. 5. The plate-shaped part 43 of a leaf spring 42 held by a disk cassette holder pushes the end of the protrusion 34 of the disk hub 30 to cause the large annular part 32 of the disk hub 30 to abut the hub part 42 of the spindle hub 38 to thereby position the disk hub 30. For this purpose, the height of the small annular part 33 of the disk hub 30 is determined such that the small annular part 33 does not abut the hub part of the spindle hub 38, and height of the spindle hub 33 is determined such that its end does not abut the disk hub 30.

Figure 6:
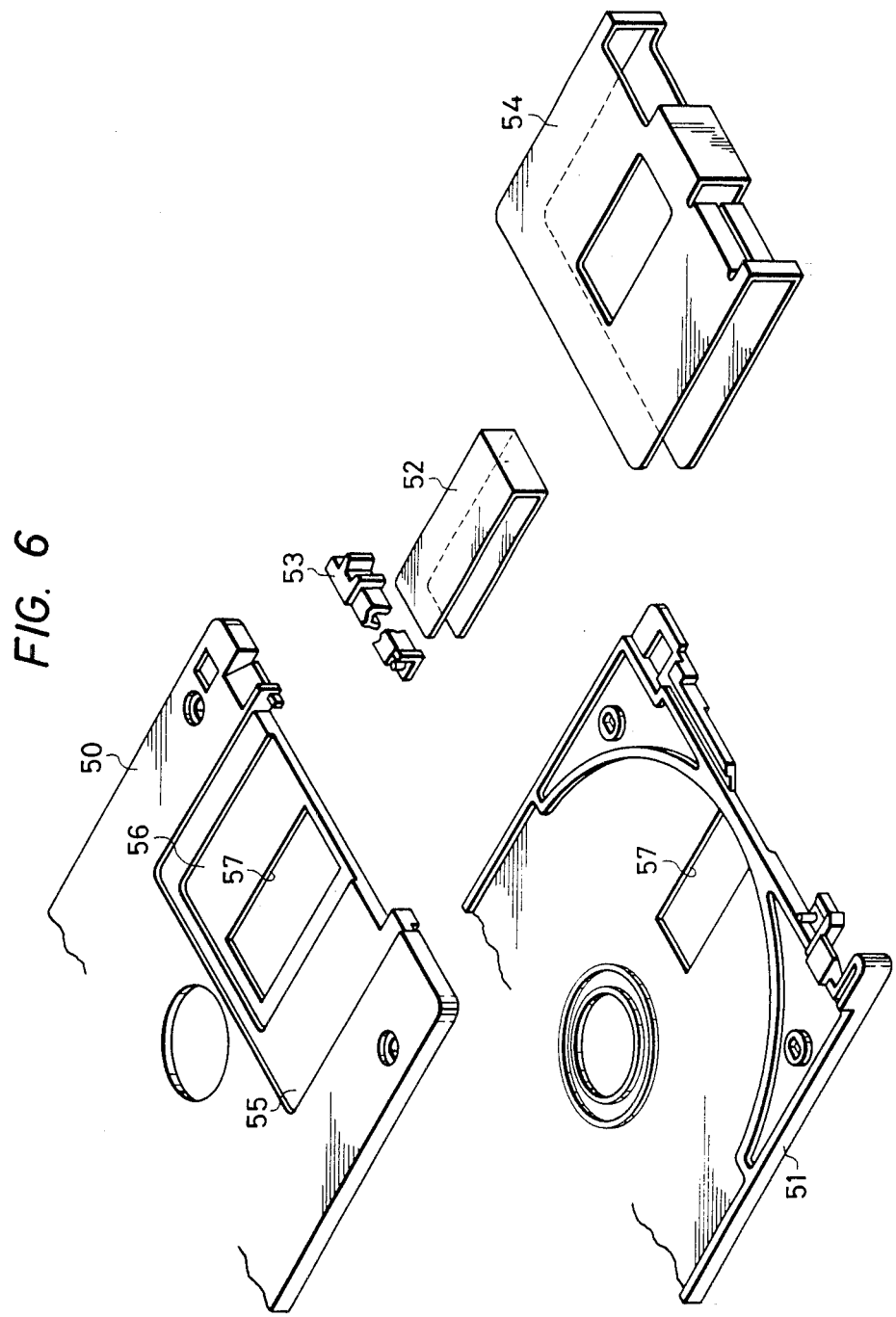
FIG. 6 is an exploded perspective view of a second embodiment of the present invention.

A second embodiment of the recording and reproducing disk cassette of the present invention is shown in FIGS. 6–8, wherein it will be apparent that the case provided for accommodating the disk consists of upper half 50 and lower half 51. In this embodiment there are also provided a shutter member consisting of shutter plate 52 and engaging member 53 and a protective plate 54 adapted to cover the shutter member.

The upper half 50 of the case has a first step 55 on which the protective plate 54 is mounted, and a second step 56, which is lower than the first step 55 by a distance corresponding to the thickness of the wall of the shutter plate 52. The second step 56 slidably supports the shutter plate 52. The shutter plate 52 and the engaging member 53 are assembled together and mounted on the second step 56 of the upper half 50. As in the case of the first embodiment described above, the shutter plate 52 is urged by a spring to normally cover the opening 57 formed in the upper and lower halves 50 and 51. After the shutter member, consisting of the shutter plate 52 and the engaging member 53, has been mounted on the case in the above-described manner, the protective plate 54 is mounted on the first step 55.

As is apparent from the above description, in the recording and reproducing disk cassette according to the present invention, the first steps are lower than the outer surface of the case, the second steps are lower than the surfaces of the first steps, the shutter plate is mounted on the second steps and urged by the spring to close the openings of the case, and the protective plate, having openings at the same position as the opening of the case, is fixedly mounted on the first steps. Therefore, even though the protective plate is firmly held by the case, the load accompanying movement of the shutter plate is not increased. Accordingly, the "slideability" of the shutter plate is improved while the shutter plate is prevented from floating from the case or being contacted by components of the disk recording and reproducing device.

What is claimed is:

1. In a recording and reproducing disk cassette having a case accommodating a rotatably mounted disk which is partially exposed through first openings provided in the case which are normally maintained closed by a shutter plate which is moved when the cassette is loaded by the disk to expose the first openings, the improvement, comprising: first steps provided on said case at an elevation below the outer surface of said case, second steps provided on said case at an elevation below said first steps, said shutter plate being slidably mounted on said second steps, means urging said shutter plate to its aforesaid position to close said first openings, and a protective plate having second openings coinciding with said first openings of said case and being fixedly mounted on said first steps of said case such that said protective plate covers said shutter plate.

2. A recording and reproducing disk as claimed in claim 1, wherein said means urging said shutter plate to its aforesaid position to close said first openings comprises a spring operably connected at one end to said case and at the other end to said shutter plate.

3. A recording and reproducing disk cassette as claimed in claim 1, further comprising an engaging portion formed in said shutter plate and two cut portions provided in said protective plate for exposing said engaging portion of said shutter plate.

4. A recording and reproducing disk cassette as claimed in claim 3, wherein said two cut portions of said protective plate are located on opposite sides of said second openings.

5. A recording and reproducing disk cassette as claimed in claim 1, wherein the difference in elevation between the outer surface of said case and said first steps is substantially equal to the wall thickness of said protective plate.

6. A recording and reproducing disk cassette as claimed in claim 1, wherein said first steps comprise at least one step located closer to the center of said disk than said first openings, two steps provided on the left side of said first openings and two steps provided on the right side of said first openings.

7. A recording and reproducing disk cassette as claimed in claim 2, wherein said case is provided with an elongated groove located in the direction of movement of said shutter plate, said spring being positioned within said groove.

8. In a recording and reproducing disk cassette having a case accommodating a rotatably mounted disk which is partially exposed through first openings provided in the case which are normally maintained closed by a shutter plate which is moved when the cassette is loaded by the disk to expose the first openings, the improvement, comprising: a first step provided on said case at an elevation below the outer surface of said case, a second step provided on said case at an elevation below said first step, said shutter plate being slidably mounted on said second step, means urging said shutter plate to its aforesaid position to close said first openings, and a protective plate having second openings coinciding with said first openings of said case and being fixedly mounted on said first steps of said case such that said protective plate covers said shutter plate.

* * * * *